United States Patent [19]

Christiaens

[11] Patent Number: 5,193,084
[45] Date of Patent: Mar. 9, 1993

[54] DEVICE FOR ROTATING A DISC-SHAPED INFORMATION CARRIER INCLUDING A TURNTABLE AND FRAME

[75] Inventor: Aloïs E. Christiaens, Brussels, Belgium

[73] Assignee: U.S. Philips Corporation, New York, N.Y.

[21] Appl. No.: 865,736

[22] Filed: Apr. 9, 1992

Related U.S. Application Data

[63] Continuation of Ser. No. 613,293, Nov. 15, 1990, abandoned.

[30] Foreign Application Priority Data

Nov. 15, 1989 [NL] Netherlands .................... 8902819

[51] Int. Cl.$^5$ ............................................. F16C 35/10
[52] U.S. Cl. ..................................... 369/258; 369/266; 369/270; 360/99.08; 384/112; 384/123
[58] Field of Search ............... 369/266, 264, 258, 270; 360/99.04, 99.08, 99.11; 384/100, 109, 112, 123, 124

[56] References Cited

U.S. PATENT DOCUMENTS

| 3,870,382 | 3/1975 | Reinhoudt | 384/123 |
| 4,007,974 | 2/1977 | Huber | 384/123 |
| 4,240,141 | 12/1980 | Vasiliev et al. | 369/266 X |
| 4,380,355 | 4/1983 | Beardmore | 384/123 |
| 4,573,807 | 3/1986 | Asada et al. | 384/100 |
| 4,686,592 | 8/1987 | Carroll et al. | 360/99.11 X |
| 4,998,033 | 3/1991 | Hisabe et al. | 384/112 X |
| 5,018,881 | 5/1991 | Asada | 384/113 |

Primary Examiner—Stuart S. Levy
Assistant Examiner—Joseph A. Rhoa

[57] ABSTRACT

A device is disclosed which includes a frame (1), a turntable (3), and an electromagnetic drive unit comprising a stator section (5) and a rotor section (7). The turntable, which is rotatable about a shaft (19), and a frame portion (4) have facing annular bearing surfaces (21A and 21B respectively) to form a dynamic axial bearing. The bearing surfaces are coaxial with the shaft and radially spaced from this shaft. One of the bearing surfaces has at least one pattern of grooves which causes a pressure to be built up in a medium present between the bearing surfaces during rotation of the rotor section relative to the stator section.

7 Claims, 2 Drawing Sheets

DEVICE FOR ROTATING A DISC-SHAPED INFORMATION CARRIER INCLUDING A TURNTABLE AND FRAME

This is a continuation of application Ser. No. 07/613,293, filed Nov. 15, 1990, now abandoned.

BACKGROUND OF THE INVENTION

1. Field of the Invention

The invention relates to a device for rotating a disc-shaped information carrier, which device comprises a frame, a turntable which is rotatable about a shaft and is journalled relative to the frame by means of a radial bearing, the turntable having a supporting surface for the information carrier, and an electromagnetic drive unit comprising a stator section secured to the frame and a rotor section secured to the turntable.

2. Description of the Related Art

A device of the type referred to above is known from British Patent Application GB 2,180,413. The known device is intended in particular for rotating hard discs for data storage and is used in a scanning system comprising a scanning unit. The device comprises a d.c. motor having a stator with stationary coils and a rotor with permanent magnets. The rotor is secured to a rotor shaft which is rotatably supported relative to the stator by means of two ball-bearings. The rotor shaft carries a turntable for supporting the hard disc. A drawback of the known device is that the bearing arrangement used therein may give rise to impermissible wobbling of the rotor shaft and the turntable secured thereto. In particular, comparatively large irregular excursions (non-repeatable runouts) of the turntable in a radial and, particularly, in an axial sense may arise owing to ball-bearing faults, which are caused for example by out-of-roundness of the balls or by deformed ball tracks. The resulting undesirable excursions by nature often fall beyond the control range of the scanning system, so that the scanning unit may collide with and thereby damage the hard disc.

SUMMARY OF THE INVENTION

It is an object of the invention to provide measures so as to preclude the occurrence of impermissible excursions of the turntable in a device as defined in the opening paragraph.

To this end the device in accordance with the invention is characterized in that the turntable and a frame portion facing the turntable are formed with facing annular bearing surfaces which are coaxial with and radially spaced from the shaft and extend parallel to the supporting surface to form an independent dynamic axial bearing, at least one of the bearing surfaces having at least one pattern of grooves which, as the rotor section is rotated relative to the stator section, acts to build up a pressure in a medium interposed between the bearing surfaces.

As a result of the constantly increasing information densities on information discs, in particular hard discs, the mechanical accuracy requirements imposed on devices of the present type become increasingly stringent, in particular in order to combat non-repeatable runouts of the turntable in a radial but, particularly, in an axial sense. An advantage of the device in accordance with the invention is that in operation the cooperating annular bearing surfaces cooperate with one another without mechanical contact, which minimizes the likelihood of problems as a result of mechanical faults or irregularities in the bearing surfaces. Preferably, the radial distance between the shaft and the annular bearing surfaces is made as large as possible so as to enable both a high axial stiffness and a high resistance to tilting of the independently operating axial dynamic bearing thus formed to be obtained. As a result of this, the turntable will perform well-defined rotary movements under normal operating conditions, the non-repeatable runouts having favourable values of, for example, smaller than $0.2\ \mu$.

The device in accordance with the invention is particularly suitable for use in apparatuses for optical recording, such as optical disc players, or for magnetic recording, such as Winchester drives.

It is to be noted that an annular spiral-groove bearing is known per se from the book "Spiral Groove Bearings", E. A. Muijdeman, 1966, pp. 76, 77, Philips Technical Library. The known axial spiral-groove bearing has two annular bearing surfaces, which directly adjoin a rotary shaft, and it is not capable of handling the forces and torques exerted on turntables of devices for rotating disc-shaped information carriers.

It is to be noted also that a head drum for a video recorder is known from Japanese Patent Application 64-8505, which head drum employs a combined aerodynamic bearing, comprising a radial and an axial bearing section. Both the radial section and the adjoining axial bearing section of the combined bearing have bearing grooves, air extracted from the radial bearing section being pumped out via the axial bearing section during operation.

An embodiment of the device in accordance with the invention is characterized in that the medium present between the bearing surfaces is a gas, in particular air. This embodiment is very suitable for use in apparatuses employing a hard data-disc as a record carrier. In such an apparatus the hard disc is arranged in an ultra-clean space, which should not be contaminated during the life of the apparatus. Therefore, special provisions have been made to preclude the ingress of dust and gases into the conditioned space during operation. A bearing arrangement comprising ball-bearings should, for example, be provided with a sealing system containing a magnetic liquid.

A further embodiment of the device in accordance with the invention is characterized in that an annular zone adjoining the circumferential edge of the turntable is formed with bearing surfaces which are spaced from the shaft. This results in a dynamic axial bearing having an optimum resistance to tilting.

Another embodiment of the device in accordance with the invention is characterized in that the radial bearing is a hydrodynamic spiral-groove bearing, the mass centre of the turntable with the rotor section secured thereto being situated inside the bearing.

An advantage of this embodiment is that the device is suited both for use in a horizontal position, in which the shaft is oriented vertically, and in a vertical position, in which the shaft extends horizontally.

The invention also relates to a turntable and to a frame for use in the device in accordance with the invention.

BRIEF DESCRIPTION OF THE DRAWINGS

The invention will now be described in more detail, by way of example, with reference to the drawings, in which FIG. 1 in a diagrammatical longitudinal sectional view, not to scale, shows a first embodiment of the device in accordance with the invention, comprising an aerodynamic axial bearing.

DETAILED DESCRIPTION OF THE PREFERRED EMBODIMENTS

Figure 1:
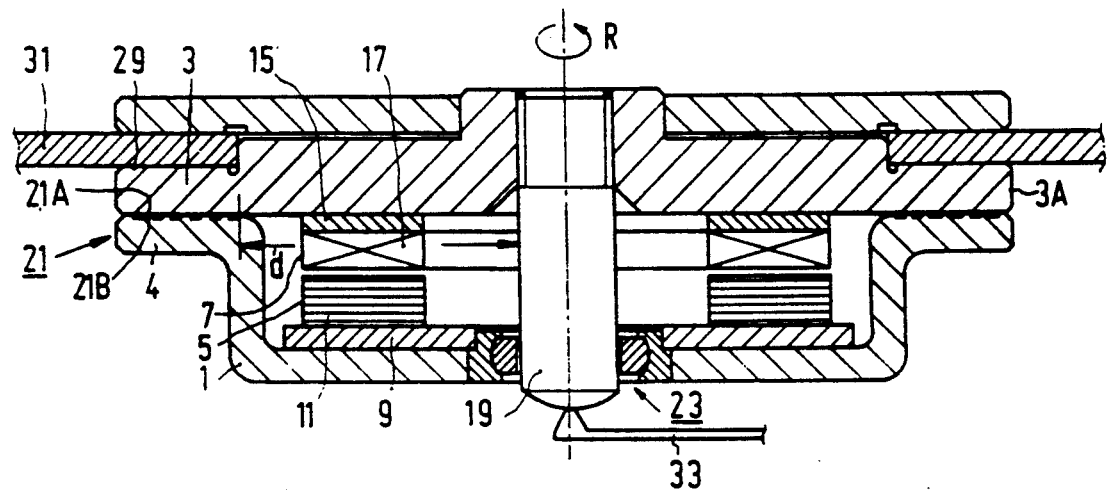
Figure 2:
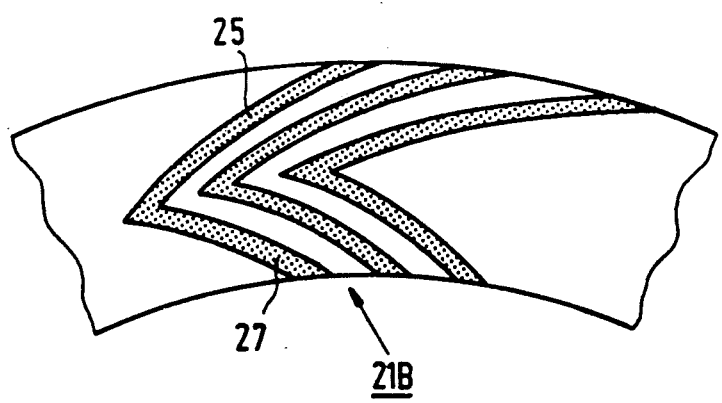
FIG. 2 shows diagrammatically a part of a bearing surface of the dynamic axial bearing of the embodiment shown in FIG. 1.

The embodiment of the device in accordance with the invention shown in FIG. 1 comprises a frame 1, an electromagnetic drive unit, and a turntable 3. The electromagnetic drive unit, which is constructed as a brushless d.c. motor, comprises a stator section 5, secured to the frame 1 which is constructed as a motor housing, and a rotor section 7, secured to the turntable 3. The stator section 5 comprises a plurality of cylindrical coils 11 arranged on a printed circuit board 9, and cooperates with a suitable number of axially magnetized permanent magnets 17 of the rotor section 7 via an air gap, said magnets being arranged on a ferromagnetic ring 15. The turntable is rigidly secured to a rotatable shaft 19, which in accordance with the invention is supported relative to the frame 1 by means of a dynamic axial bearing 21 and a radial bearing 23. In the present example, the dynamic axial bearing 21 is constructed as a gas bearing and comprises two facing annular bearing surfaces 21A and 21B, the bearing surface 21A being provided in a zone adjoining the circumferential edge 3A of the turntable and situated on the turntable side facing the frame 1, and the bearing surface 21B being situated on a flange portion 4 of the frame 1. The bearing surface 21A, which like the bearing surface 21B is situated at a maximal radial distance d from the shaft 19, is perfectly smooth. In contrast, the bearing surface 21B has two patterns of shallow grooves. In FIG. 2, which is a plan view of a part of the bearing surface 21B, the patterns bear the reference numerals 25 and 27. The grooves of one pattern are oriented oppositely to the grooves of the other pattern in order that, when the turntable 3 rotates in the direction indicated by the arrow R in FIG. 1, the patterns 25 and 27 force the gas, in the present example air, between the bearing surfaces 21A and 21B in opposing directions, causing an aerodynamic pressure to be built up in the axial bearing 21 in a manner known per se. In the present example the radial bearing 23 is constructed as a self-aligning plain bearing.

The device shown in FIG. 1 may be employed, for example, in apparatuses for rotating magnetically readable hard discs. For this purpose the turntable 3 has a supporting surface 29 for supporting a hard disc 31. In order to enable electrostatic charges of the hard disc 31 to be drained an earthing strip 33 in contact with the shaft 19 has been provided.

Hereinafter, parts corresponding to those in FIG. 1 bear the same reference numerals.

Figure 3:
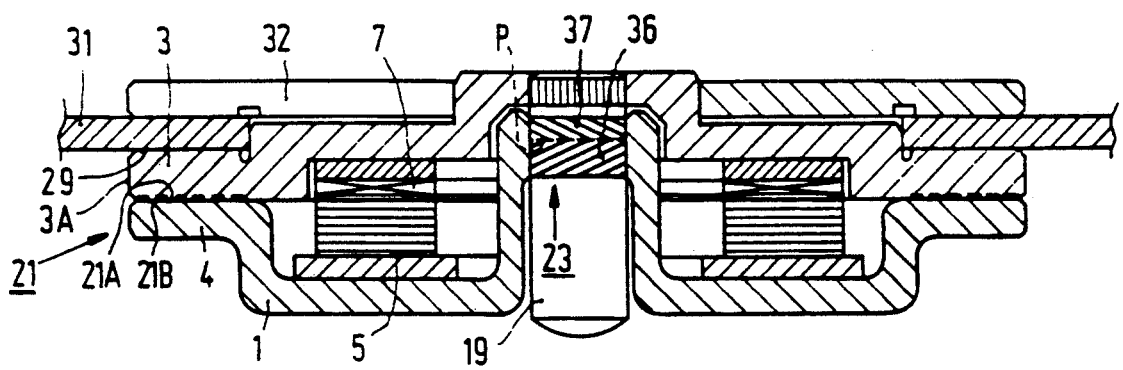
FIG. 3 is a diagrammatical longitudinal sectional view, not to scale, of a second embodiment.

The embodiment as shown in FIG. 3 comprises a frame 1, a turntable 3 having a supporting surface 29, and a drive unit comprising a stator section 5 and a rotor section 7. In the present example an optically readable disc 31 is situated on the turntable 3 and is pressed onto the supporting surface 29 by a pressure member 32. The electromagnetic drive unit may be of the same type as used in the device shown in FIG. 1. In accordance with the invention the turntable 3 is supported in the frame 1 by means of a dynamic axial bearing 21 and a dynamic radial bearing 23. The dynamic bearing 21 comprises two bearing surfaces 21A and 21B, which are each annular, coaxial with the shaft 19, and extend parallel to the supporting surface 29. The bearing surface 21B, which is formed on flange-shaped frame portion 4 surrounding the stator section 5, is perfectly smooth. The surface 21A, which adjoins or substantially adjoins the circumferential edge 3A of the turntable 3, has patterns of grooves related to the patterns 25 and 27 in FIG. 2. Air is present between the facing bearing surfaces 21A and 21B. The radial bearing 23 is constructed as a hydrodynamic bearing, known per se, a lubricant being present between the cylindrical bearing surfaces, of which at least one surface has been provided with a pattern of grooves. The spiral-groove bearing 23 is positioned in such a manner that the centre of gravity of the rotary section of the device shown is situated inside the bearing, preferably in the plane P defined by and situated between the two patterns of grooves 36 and 37 of the bearing. If desired, the bearing 23 may be provided with a sealing system to preclude the escape of lubricant vapour.

Figure 4:
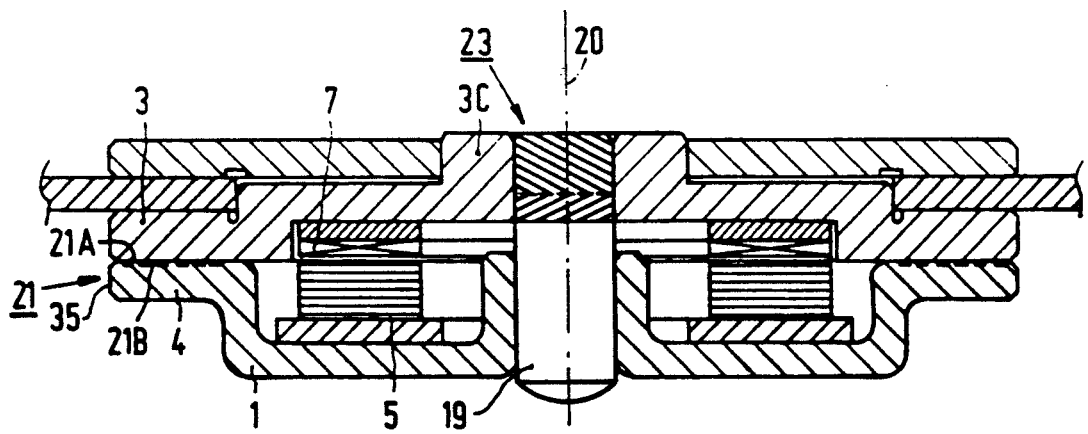
FIG. 4 is a diagrammatical longitudinal sectional view, not to scale, of a third embodiment.

The embodiment of the device in accordance with the invention shown in FIG. 4 comprises a frame 1 constructed as a motor housing, in which a shaft 19 is fixedly secured, a turntable 3 which is rotatable about an axis of rotation 20, and an electromagnetic drive unit for rotating the turntable 3 relative to the frame 1. The drive unit comprises a stator section 5 secured in the frame 1 and a rotor section 7 secured to the turntable 3, and is of a construction similar to the drive units already described. The frame 1 comprises an annular outwardly directed flange 4 which extends transversely of the shaft 19, which surrounds the stator section 5, which forms a circumferential surface 35 of the device, and which exhibits a bearing surface 21B of a dynamic axial bearing 21. A bearing surface 21A provided on the turntable 3 faces the bearing surface 21B, which has a pattern of grooves. Given the dimensions of the device, both annular bearing surfaces 21A and 21B are situated at a maximum distance from the axis of rotation 20 and are constructed as described with reference to FIGS. 1 and 2. The space between the dynamic bearing 21 and the shaft 19 is utilised effectively to accommodate the drive unit. The device further comprises a dynamic radial bearing 23 having two cylindrical bearing surfaces, one of these surfaces being formed by a turntable section 3C and the other by the fixed shaft 19. Between these bearing surfaces, of which one surface has been provided with one or more patterns of shallow spiral grooves, a medium is present to build up a dynamic pressure during rotation of the turntable 3.

I claim:

1. A device for rotating a disc-shaped information carrier, which device comprises a frame, a turntable which is rotatable about a shaft and is journalled relative to the frame by means of a radial bearing, the turntable having a supporting surface for the information carrier, and an electromagnetic drive unit comprising a stator section secured to the frame and a rotor section secured to the turntable, wherein the turntable and a frame portion facing the turntable are formed with facing annular bearing surfaces to form a dynamic axial bearing which is coaxial with and radially spaced from the shaft and extends parallel to the supporting surface, at least one of the bearing surfaces having at least one pattern of grooves which, as the rotor section is rotated relative to the stator section, acts to build up a pressure in a medium interposed between the bearing surfaces, said frame including an upwardly extending bowl shaped element, and wherein space is provided under the turntable and between said shaft and said upwardly extending bowl shaped element which space houses said stator section and said rotor section.

2. A device as claimed in claim 1, characterized in that the medium present between the bearing surfaces is a gas.

3. A device as claimed in claim 2, wherein said gas includes air.

4. A device as claimed in claim 1, characterized in that the frame is constructed as a motor housing.

5. A device as claimed in claim 1, characterized in that the radial bearing is a hydrodynamic spiral-groove bearing, the center of gravity of the turntable with the rotor section secured thereto being situated inside the radial bearing.

6. A device as claimed in claim 1, characterized in that an annular zone adjoining the circumferential edge of the turntable is formed with a bearing surface with said at least one pattern of grooves.

7. A device as claimed in claim 1, wherein an annular zone in said frame portion is formed with a bearing surface with said at least one pattern of grooves.

* * * * *